United States Patent [19]

Pringle et al.

[11] 4,452,310

[45] Jun. 5, 1984

[54] METAL-TO-METAL HIGH/LOW PRESSURE SEAL

[75] Inventors: Ronald E. Pringle; William D. Eatwell, both of Houston, Tex.

[73] Assignee: Camco, Incorporated, Houston, Tex.

[21] Appl. No.: 322,318

[22] Filed: Nov. 17, 1981

[51] Int. Cl.³ .............................................. E21B 43/12
[52] U.S. Cl. .................................... 166/319; 166/321; 92/185
[58] Field of Search ............... 166/319, 321, 322, 323, 166/324; 251/63.4; 92/182, 183, 184, 185

[56] References Cited

U.S. PATENT DOCUMENTS

| | | | |
|---|---|---|---|
| 2,364,823 | 12/1944 | Schnell | 92/185 |
| 2,757,993 | 8/1956 | Flick | 92/184 |
| 2,977,167 | 3/1961 | Barnhart | 92/183 |
| 3,592,105 | 7/1971 | Fryklund | 92/181 P |
| 3,845,818 | 11/1974 | Deaton | 166/322 |
| 4,062,406 | 12/1977 | Akkerman et al. | 166/323 |
| 4,161,219 | 7/1979 | Pringle | 166/324 |

FOREIGN PATENT DOCUMENTS 679018 9/1952 United Kingdom .................. 92/184

*Primary Examiner*—Stephen J. Novosad
*Assistant Examiner*—William P. Neuder
*Attorney, Agent, or Firm*—Fulbright & Jaworski

[57] ABSTRACT

A dynamic metal-to-metal seal for use in a double acting piston and cylinder for use in high pressures and temperatures. First and second metal cup seals engage the piston and face in opposite directions for sealing against the cylinder wall whereby the higher pressure in the cylinder acting against the first or second seal will move the piston. In order to prevent high differential pressures across the seals when the piston is actuated, means are provided for transmitting fluid pressure from the lower pressure in the cylinder to the cylinder between the cup seal. The piston includes first and second oppositely directed seats with first and second metal seals telescopically movable on the piston adjacent one of the seats and each metal seal includes a sealing surface adapted to mate with one of the seats. Each metal seal also includes an outwardly directed cup seal extending away from their seats and sealingly engaging the cylinder. First and second passageways extend from the inside of each cup of the seals through a seat and into the cylinder behind the outwardly directed cup seals. The first and second metal seals are engagable with each other whereby when one metal seal is seated the other metal seal is unseated allowing fluid pressure to flow through the unseated seal to provide a lower differential pressure across the sealing seal.

8 Claims, 6 Drawing Figures

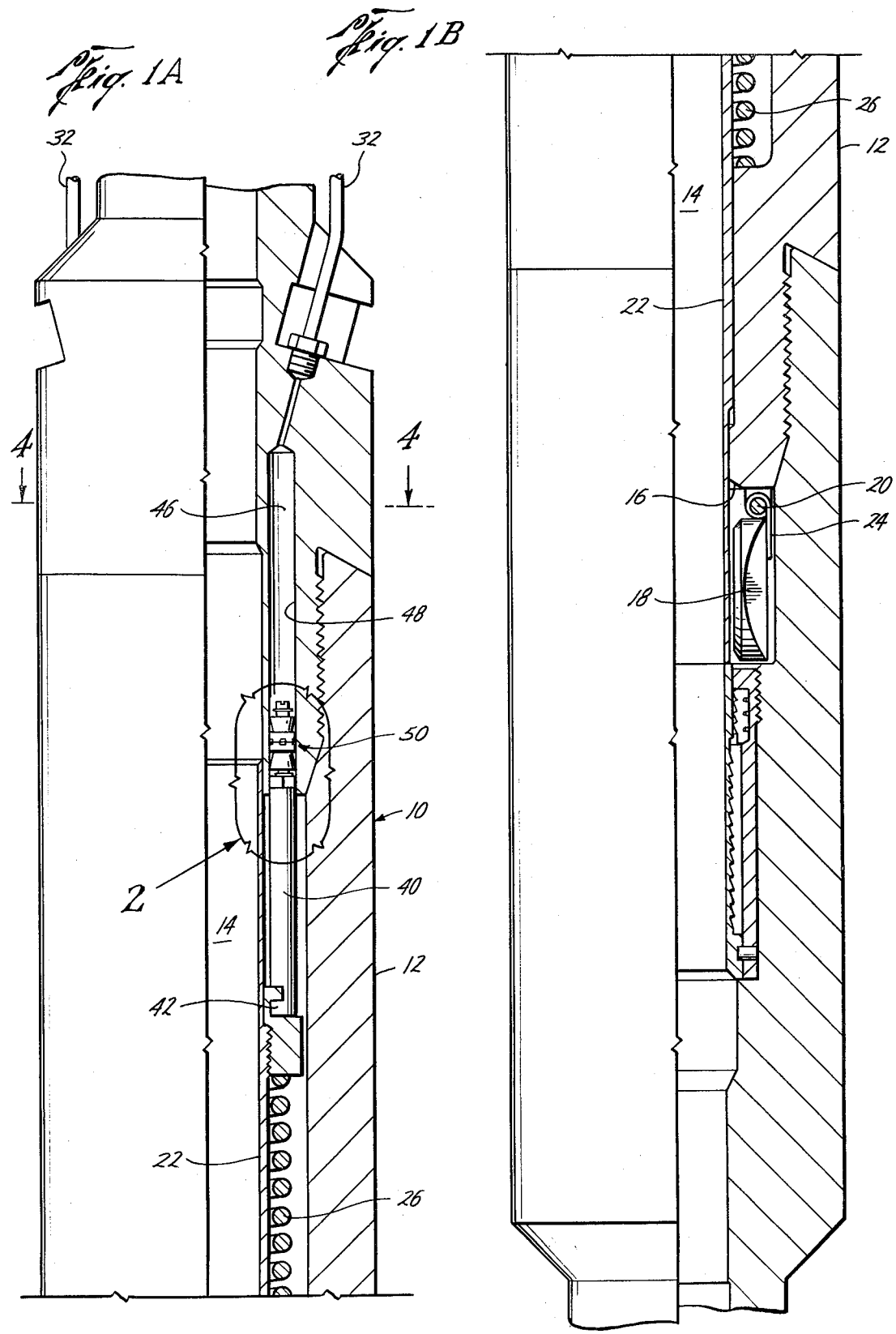

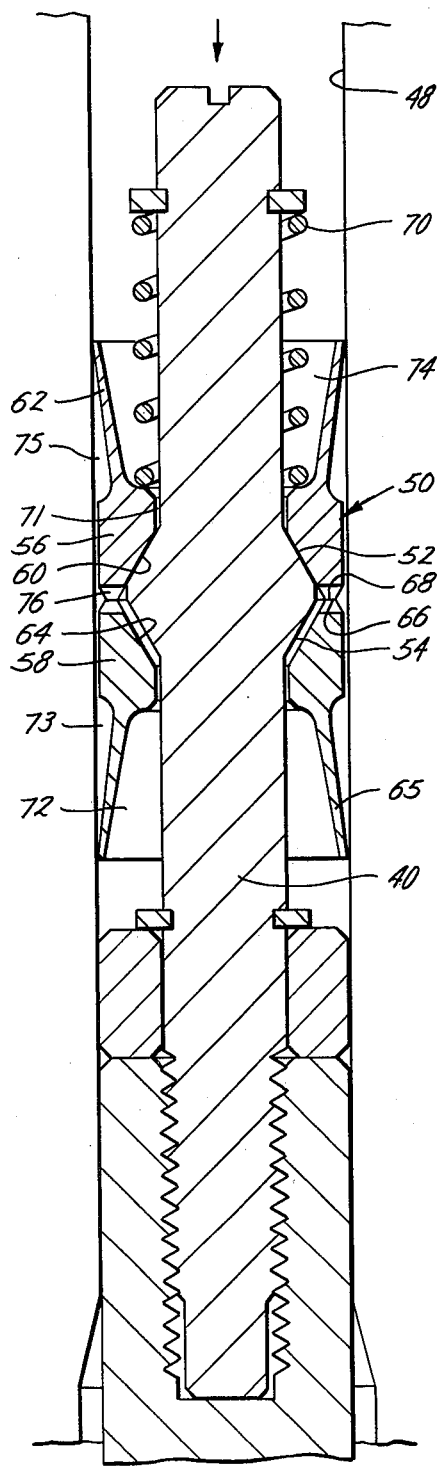
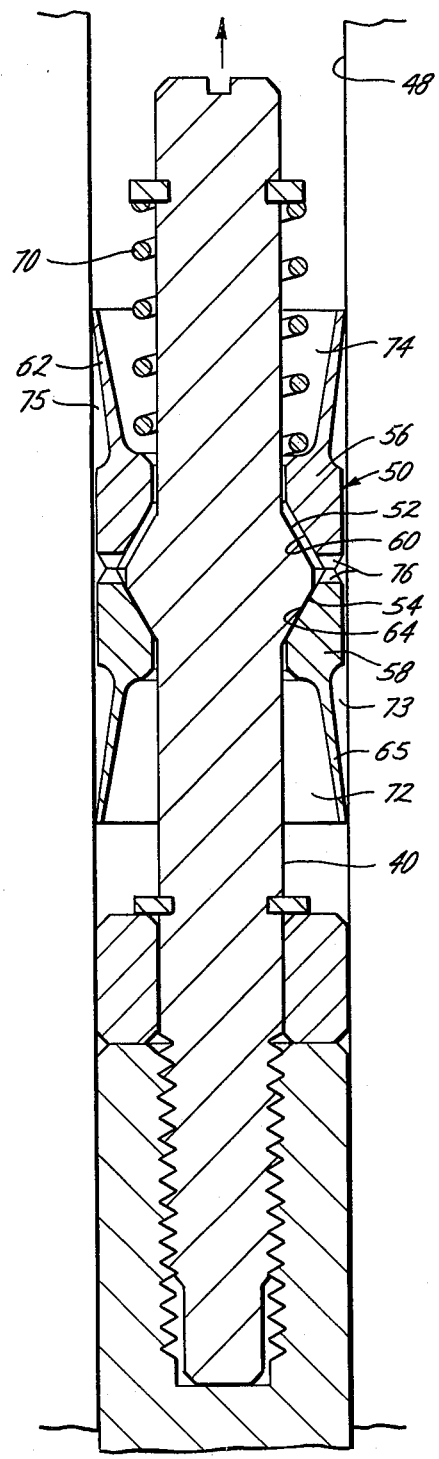

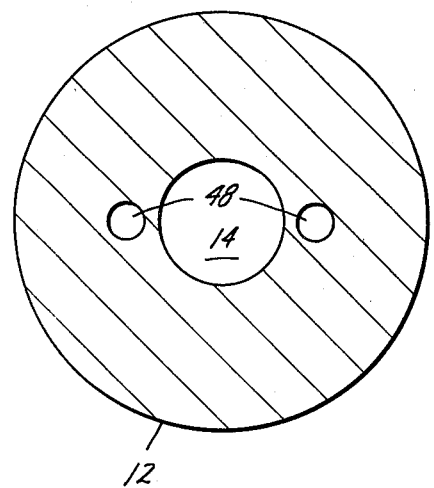
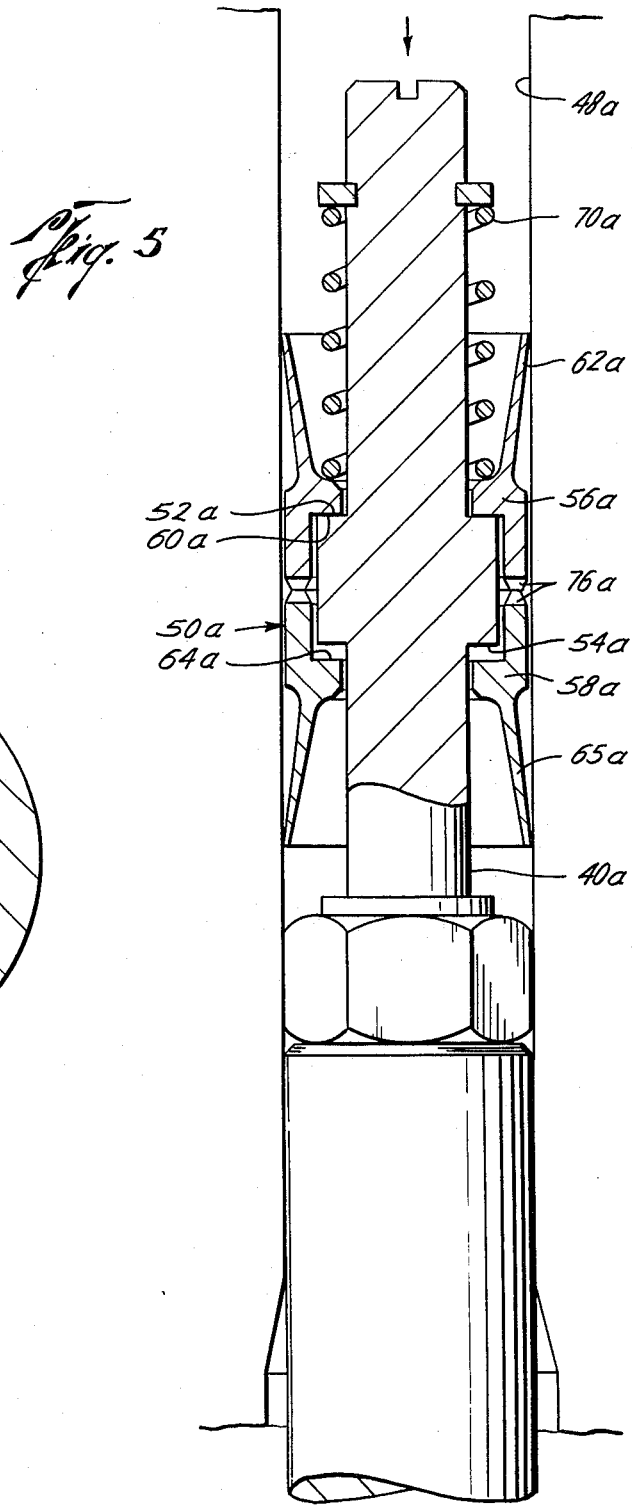

METAL-TO-METAL HIGH/LOW PRESSURE SEAL

BACKGROUND OF THE INVENTION

It is well known to utilize an elastomer seal in a hydraulic piston and cylinder assembly such as shown in the safety valve in U.S. Pat. No. 4,161,219.

However, elastomer seals are limited as to the temperatures in which they can operate, the pressures which they can withstand, and the length of time before they must be replaced.

The present invention is directed to a metal-to-metal dynamic seal which can be used in various applications having a double acting piston and cylinder in extreme high pressure and temperature applications which surpass the limits of general elastomers. Furthermore, the present seal is directed to reducing the differential pressures across the seal when the piston is actuated. And in particular, the seal of the present invention is particularly useful in actuating a well safety valve which is subjected to high downhole pressures and temperatures.

SUMMARY

The present invention is directed to a metal-to-metal pressure seal for use in a double acting piston and cylinder and includes first and second metal cup seals engaging the piston and facing in the opposite directions and engaging and sealing against the cylinder whereby the higher pressure in the cylinder acting against the first or second seal will move the piston. In order to reduce the differential pressure across the seals, means are provided for transmitting fluid pressure from the lower pressure in the cylinder acting on the first or second seal to the cylinder between the cup seals for providing a lower differential pressure across the seals.

A still further object of the present invention is the provision of a metal-to-metal high/low pressure seal in which the piston includes first and second oppositely directed seats. The first metal seal is positioned adjacent the first seat and includes a sealing surface adapted to mate with the first seat and includes an outwardly directed cup seal extending away from the first seat and engaging the cylinder. Similarly, a second metal seal is positioned adjacent the second seat and includes a sealing surface adapted to mate with the second seat and includes an outwardly directed cup seal extending away from the second seat and engaging the cylinder. The first and second metal seals are engagable with each other whereby when the sealing surface of one metal seal is seated on its mating seat the sealing surface of the other metal seat is unseated from its mating seat allowing fluid pressure to flow through the unseated seal and into the cylinder behind the outwardly directed cup seals.

Yet a still further object of the present invention is the provision of spring means between the piston and one of the metal seals yieldably urging said one seal against its mating seat.

Still a further object of the present invention is wherein the first and second seats are of an angle of at least ten degrees from the axis of the piston.

Still a further object of the present invention is wherein the first and second metal seats are telescopically movable on the piston and a first passageway extends from the inside of the cup of the first seal through the first seat and into the cylinder, and a second passageway extends from the inside of the cup of the second seal through the second seat and into the cylinder for directing the lower pressure to the back side of the actuated cup seals for reducing the differential pressure across the seals.

Still a further object of the present invention is the provision of the metal-to-metal pressure seal of the present invention in use in a well safety valve in which the piston is exposed on the upper side to hydraulic control fluid and is exposed on its lower side to pressure in the safety valve and well tubing.

Yet a still further object of the present invention is wherein the piston extends outwardly toward but is spaced from the cylinder and the first and second metal seals are separate from each other and extend over the outer extent of the piston.

Other and further objects, features and advantages will be apparent from the following description of presently preferred embodiments of the invention given for the purpose of disclosure and taken in conjunction with the accompanying drawings.

BRIEF DESCRIPTION OF THE DRAWINGS

FIGS. 1A and 1B are continuations of each other and are fragmentary elevational views, in quarter section, of a well safety valve utilizing the present invention, FIG. 2 is an enlarged cross-sectional view of the area 2 shown in FIG. 1A with the piston moving in a downwardly direction, FIG. 3 is a view similar to FIG. 2 showing the piston moving in an upwardly direction, FIG. 4 is a cross-sectional view taken along the line 4—4 of FIG. 1A, and FIG. 5 is an elevational view, in cross section, of another embodiment of the present invention shown with the piston moving in the downwardly direction.

DESCRIPTION OF THE PREFERRED EMBODIMENTS

While the seal of the present invention is useful in various types of double acting piston and cylinder assemblies, for purposes of illustration only, the present invention will be described in connection with a piston type well safety valve, but it will be understood that the present invention may be used in other types of applications and in other types of safety valves.

Referring now to the drawings, and particularly to FIGS. 1A and 1B, the subsurface safety valve of the present invention is generally indicated by the reference numeral 10 and generally includes a body or housing 12 which is adapted to be connected in a well tubing and to permit well production therethrough under normal operating conditions, but in which the safety valve 10 may close or be closed in response to abnormal conditions.

The valve 10 includes a bore 14, an annular valve seat 16 positioned about the bore 14, a valve closure element such as flapper valve 18 connected to the body 12 by a pivot pin 20. Thus, when the flapper valve 18 is in the upper position and seated on the valve seat 16, the safety valve 10 is closed blocking flow upwardly through the bore 14 and well tubing.

A sliding tube or tubular member 22 is telescopically movable in the body 12 and through the valve seat 16. As best seen in FIG. 1B, when the tubular member 22 is moved to a downward position, the tube 22 pushes the flapper 18 away from the valve seat 16. Thus, the valve 10 is held in the open position so long as the tube 22 is in the downward position. When the tube 22 is moved upwardly, the flapper 18 is allowed to move upwardly on to the seat 16 by the action of a spring 24 and also by the action of fluid flow moving upwardly through the bore 14 and behind the flapper 18.

The tubular member 22 is biased in an upwardly direction by suitable means which may include a spring 26 for yieldably urging the member 22 in an upward direction to release the flapper 18 for closing the valve 10. The safety valve 10 is controlled by the application or removal of a pressurized fluid, such as hydraulic fluid, through a control path or line, such as control line 32 extending to the well surface or the casing annulus which supplies pressurized hydraulic fluid to the top of a piston which in turn acts on the tubular member 22 to move the tubular member 22 downwardly forcing the flapper 18 off of the seat 16 and into the full open position. The piston may be an annular piston or may be a plurality of circular pistons 40, such as two, positioned in the housing 12 and connected to the tubular member 22 by a connection 42. The safety valve 10 is controlled by the application or removal of pressurized fluid through the control line 32 and fluid passageway 46 to supply hydraulic control pressurized fluid to the cylinder 48 and the top of the piston 40. The bottom of the piston 40 is exposed to fluid pressure in the bore 14 which acts against the bottom of the piston 40 for biasing the tubular member 22 to the closed position when fluid control pressure is removed from the control line 32.

The above description is generally disclosed in U.S. Pat. No. 4,161,219. However, the prior art has utilized an elastomer type seal between the piston 40 and the cylinder 48 in both the circular type pistons 40 and the annular type piston safety valves. However, the elastomer type seals are limited both as to temperature and pressure, both absolute and differential, at which they may be operated and have a limited life. The present invention is directed to providing a metal seal which is operable in extreme high pressures and temperatures surpassing the limits of general elastomers.

Referring now to FIG. 2, the seal assembly of the present invention is generally indicated by the reference numeral 50 and generally includes first 52 and second 54 oppositely directed seats on the piston 40, and a first metal seal 56 and a second metal seal 58 which are telescopically movable on the piston 40. The first metal seal 56 is positioned adjacent the first seat 52 and includes a sealing surface 60 adapted to mate with and seal against the first seat 52. The first seal 56 also includes an outwardly directed cup seal 62 which extends away from the first seat 52 and sealingly engages the cylinder 48. Only the cup seal 62 of the seal 56 seals against the cylinder 48. The first seal 56 is moved downwardly by hydraulic fluid control pressure through line 32 flowing into the cylinder 48 and against the inside 74 of the cup seal 62 of the seal 56.

The second metal seal 58 is positioned on the piston 40 adjacent the second seat 54 and includes a sealing surface 64 which is adapted to mate with and seal with the second seat 54. The seal 58 also includes an outwardly directed cup seal 65 which extends away from the seat 54 and sealingly engages the cylinder 48. Only the cup seal 65 of the seal 58 seals against the cylinder 48. The second seal 58 seats against the second seat 54 when the pressure in the well and thus in the bore 14 of the safety valve 10 is greater than the hydraulic control fluid pressure in line 32 and acts against the bottom of the piston 40 and against the inside 72 of the cup seal 65 of the second seal 58.

The first seal 56 and the second seal 58 are engageable with each other but are preferably separate for manufacturing purposes. Thus the bottom 66 of the seal 56 engages the top 68 of the seal 58. It is to be noted that when hydraulic control fluid is applied to the top of the cylinder 48 the first seal 56 will be moved downwardly with the sealing surface 60 seated on the seat 52 and the outwardly directed cup seal 62 seals against the cylinder 48 preventing bypass of control fluid through the cylinder 48 past the piston 40. Similarly, when pressure is relieved from the top of the cylinder 48 through the control line 32 fluid pressure below the piston 40 acts against the second seal 58 to move the sealing surface 64 into a sealing relationship with the seat 54 and the outwardly directed cup seal 65 seals against the interior of the cylinder 48 preventing bypass of fluid through the seal 50 thereby moving the piston 40 upwardly.

As the volume of control fluid flowing through the line 32 into the top of the cylinder 48 may be small compared with the size of the cylinder 48, it may be desirable to provide a spring 70 between the piston 40 and the first seal 56 for initially seating the first seal 56 on the first seat 52. However, the seal 56 will satisfactorily seat on the seat 52 without the spring 70 by sizing the clearance 71 between the piston 40 and the seal 56 small enough to create a sufficient pressure to seat the seal 56.

However, the safety valve 10 may be used in wells having extremely high pressures, for example 20,000 pounds per square inch, in which case the pressure acting on the bottom of the second seal 58 on the inside 72 of the cup seal 65 would be 20,000 pounds per square inch. In order to open the valve 12 the control fluid in the cylinder above the first seal 56 and thus on the inside 74 of the first seal 56 would have to be greater than 20,000 pounds per square inch, such as 22,000 pounds per square inch. These extremely high pressures would not only be damaging to the seals 56 and 58 under dynamic operation but would increase the friction of the seals 56 and 58 against the cylinder 48 to undesirable values as well as increase the wear on the seals 56 and 58.

Another feature of the present invention is the provision of providing a lower differential force across the seals 56 and 58 when they are in a dynamic mode of operation. Referring to FIG. 2, a passageway extends from the inside 72 of the cup seal 65 between the seat 54 and sealing surface 64 through the space between the seals 56 and 58 and into the cylinder 48 into areas 73 and 75 behind the cups 72 and 62. Preferably, notches 76 are provided in the lower end of the upper seal 56 and the upper end of the lower seal 58 at ninety degree intervals to insure passage of the fluid pressure between the seals 56 and 58. Thus in FIG. 2, it is noted that as the piston 40 moves downwardly due to greater pressure above the piston that the pressure across lower seal 58 is equalized in the inside 72 and the outside area 73. And it is further noted that as to seal 56, using the example given above, the pressure in the inside 74 of cup seal 62 is 22,000 pounds per square inch and the pressure on the outside of the cup seal 62 in area 75 is 20,000 pounds per square inch. Therefore, there is a differential pressure across the seal 62 of only 2,000 pounds per square inch.

Referring now to FIG. 3 the pressure of the hydraulic control fluid in cylinder 48 above the piston 40 is reduced, and the piston 40 moves upwardly. The passageway is provided between the inside 74 of the cup 62 through the seat 52 and sealing surface 60 through the notches 76 to the cylinder 48 in the areas 73 and 75 behind the cups 65 and 62. Thus, the pressure on either side of the cup 62 is balanced and the pressure across the cup seal 65 is the differential between the pressure in the bore 14 of the safety valve and the relieved pressure of the hydraulic control fluid.

In FIGS. 2 and 3 the angle of the seats 52 and 54 and sealing areas 60 and 64 relative to the longitudinal axis of the piston 40 is approximately thirty degrees. However, this angle can be changed as desired although the angle should be greater than ten degrees in order to prevent the sealing surfaces 60 and 64 from wedging on to the seats 52 and 54 and sticking.

Various embodiments of the seal means 50 may be utilized such as shown in FIG. 5 in which like parts are similarly numbered with the suffix "a". In this embodiment the seats 52a and 54a and the sealing surfaces 60a and 64a are perpendicular to the axis of the piston 40a. If desired, the seat 52a and surface 64a could be directed upwardly and the seat 54a and surface 64a could be directed downwardly.

While the differential pressure across the cup seal 62 and 65 may be higher when the piston is in a static mode at either end of its travel, it is noted that the differential pressures across the cup seals 62 and 65 is lower during its dynamic operation when it is moving. It is important that the differential pressures on the cup seals 62 and 65 be low during its dynamic operation in order to reduce the friction of the seals against the inside of the cylinder 48 during its dynamic operation.

In testing of the metal seals in a safety valve with more than a thousand cycles, the test indicates no apparent wear on the metal seals 56 and 58, no greater friction than with elastomer seals, and the metal seals would withstand a static test pressure of 30,000 psi.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts, will readily suggest themselves to those skilled in the art and which are encompassed within the spirit of the invention and the scope of the appended claims.

What is claimed is:

1. A metal-to-metal high/low pressure seal for use in a double acting piston and cylinder comprising, first and second oppositely directed seats fixedly secured to the piston, said seats directed away from each other, first and second metal seals, one of which is telescopically positioned on the piston on one side of the seats, and the other of which is telescopically positioned on the piston on a second side of the seats, said first metal seal positioned adjacent the first seat and including an outwardly directed cup seal extending away from the first seat and engaging said cylinder, said first seal including a first sealing surface adapted to mate with the first seat when pressure in the cylinder acts on the interior of the cup seal to cause the sealing surface to seat on the first seat and prevent pressure in the interior of the first cup seal to flow through the seat, a second metal seal moving positioned adjacent the second seat and including an outwardly directed cup seal extending away from the second seat and engaging said cylinder, said second seal including a second sealing surface adapted to mate with the second seat when pressure in the cylinder acts on the interior of the second cup seal to cause the second sealing surface to seat on the second seat and prevent pressure in the interior of the second cup seal to flow through the second seat, said first and second metal seals engageable with each other whereby when the sealing surface of one metal seal is seated on its mating seat the sealing surface of the other metal seal is unseated from its mating seat allowing fluid pressure to flow through the unseated seal and into the cylinder behind the outwardly directed cup seals, and spring means between the piston and one of the metal seals yieldably urging said one seal against its mating seat.

2. A metal-to-metal pressure seal for use in a double acting piston and cylinder comprising, said piston including first and second oppositely directed seats, said seats directed away from each other, a first metal seal telescopically movable on the piston on one side of the seats but adjacent the first seat and including a sealing surface adapted to mate with the first seat and including an outwardly directed cup seal extending away from the first seat and engaging said cylinder, a second metal seal telescopically movable on the piston on a second side of the seats but adjacent the second seat and including a sealing surface adapted to mate with the second seat and including an outwardly directed seal extending away from the second seat and engaging said cylinder, a first passageway extending from the inside of the cup of the first metal seal through the first seat and into the cylinder behind the outwardly directed cups, a second passageway extending from the inside of the cup of the second metal seal through the second seat and into the cylinder behind the outwardly directed cups, said first and second metal seats engagable with each other whereby when the sealing surface of one metal seal is seated on its mating seat the sealing surface of the other metal seal is unseated from its mating valve seat allowing fluid pressure to flow through the unseated seal and into the cylinder behind the outwardly directed cups.

3. The apparatus of claim 2 including, spring means between the piston and one of the metal seals yieldably urging said one seal against its mating seat.

4. In a well safety valve for controlling the fluid flow through a well conduit and including a tubular housing and a valve closure member moving between open and closed positions, and a hydraulic piston and cylinder means for actuating the valve, the improvement in seal means between the piston and the cylinder comprising, said piston including first and second oppositely directed seats, said seats directed away from each other, a first metal seal positioned on a first side of said seats but adjacent the first seat and including a sealing surface adapted to mate with the first seat and including an outwardly directed cup seal extending away from the first seat and engaging the cylinder, a second metal seal positioned on a second side of said seats but adjacent the second seat and including a sealing surface adapted to mate with the second seat and including an outwardly directed cup seal extending away from the second seat and engaging said cylinder, said first and second metal seals engagable with each other whereby when the sealing surface of one metal seal is seated on its mating seat the sealing surface of the other metal seal is unseated from its mating seat allowing fluid pressure to flow through the unseated seal and into the cylinder behind the outwardly directed cup seals, and spring means between the piston and one of the metal seals yieldably urging said one seal against its mating seat.

5. In a well safety valve for controlling the fluid flow through a well conduit and including a tubular housing and a valve closure member moving between open and closed positions, and hydraulic piston and cylinder means for actuating the valve, said piston being exposed on an upper side to hydraulic control fluid and being exposed on its lower side to pressure in the safety valve, the improvement in seal means between the piston and the cylinder comprising, said piston including an upwardly directed seat and a downwardly directed seat, a first metal seal telescopically movable on the piston above the upwardly directed seat and including a sealing surface adapted to mate with the upwardly directed seat and including an upwardly and outwardly directed cup seal engaging said cylinder, a second metal seal positioned below the downwardly directed seat and including a sealing surface adapted to mate with the downwardly directed seat and including a downwardly and outwardly directed cup seal engaging said cylinder, a first passageway extending from the inside of the upwardly and outwardly directed cup seal through the upwardly directed seat and into the cylinder behind the outwardly directed cup seals, a second passageway extending from the inside of the downwardly and outwardly directed cup seal through the downwardly directed seat and into the cylinder behind the outwardly directed cup seals, said first and second metal seals being engagable with each other whereby when the sealing surface of one metal seal is seated on its mating seat, the sealing surface of the other metal seal is unseated from its mating seat allowing fluid pressure to flow through the unseated seal and into the cylinder behind the outwardly directed cup.

6. The apparatus of claim 5 including, spring means between the piston and the first metal seal yieldably urging said first seal against its mating seat.

7. The apparatus of claim 5 wherein the outwardly and downwardly directed seats are of an angle of at least ten degrees from the axis of the piston.

8. The apparatus of claim 5 wherein said piston extends outwardly toward but spaced from the cylinder and said first and second metal seals are separate from each other and extend over the outer extent of the piston.

* * * * *